July 10, 1928.
H. O. RUSSELL ET AL
1,676,965
GROUND SPEED INDICATOR
Filed April 18, 1922
2 Sheets-Sheet 2
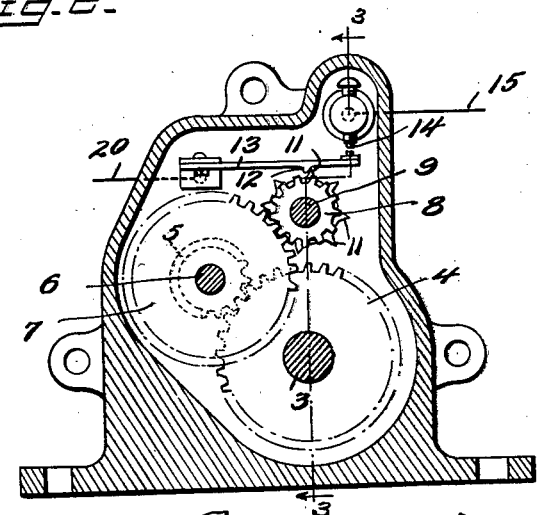
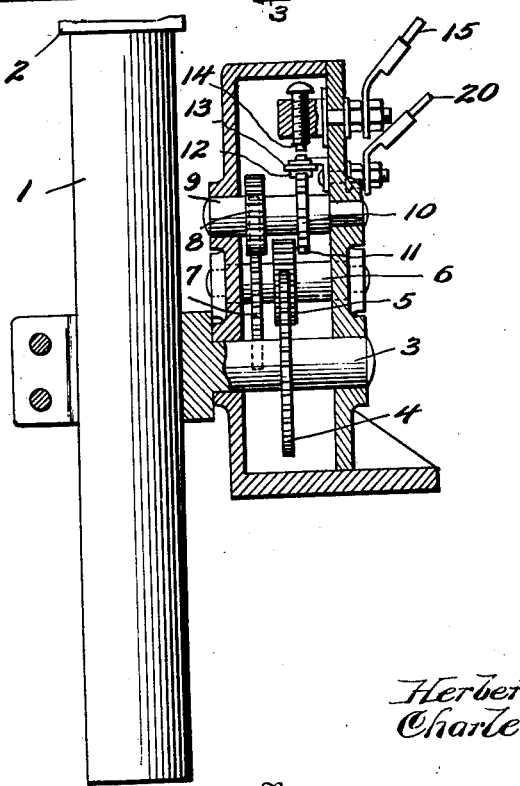
Inventor
Herbert O. Russell
Charles Leigh Paulus
By Robert H Young. Attorney Patented July 10, 1928.

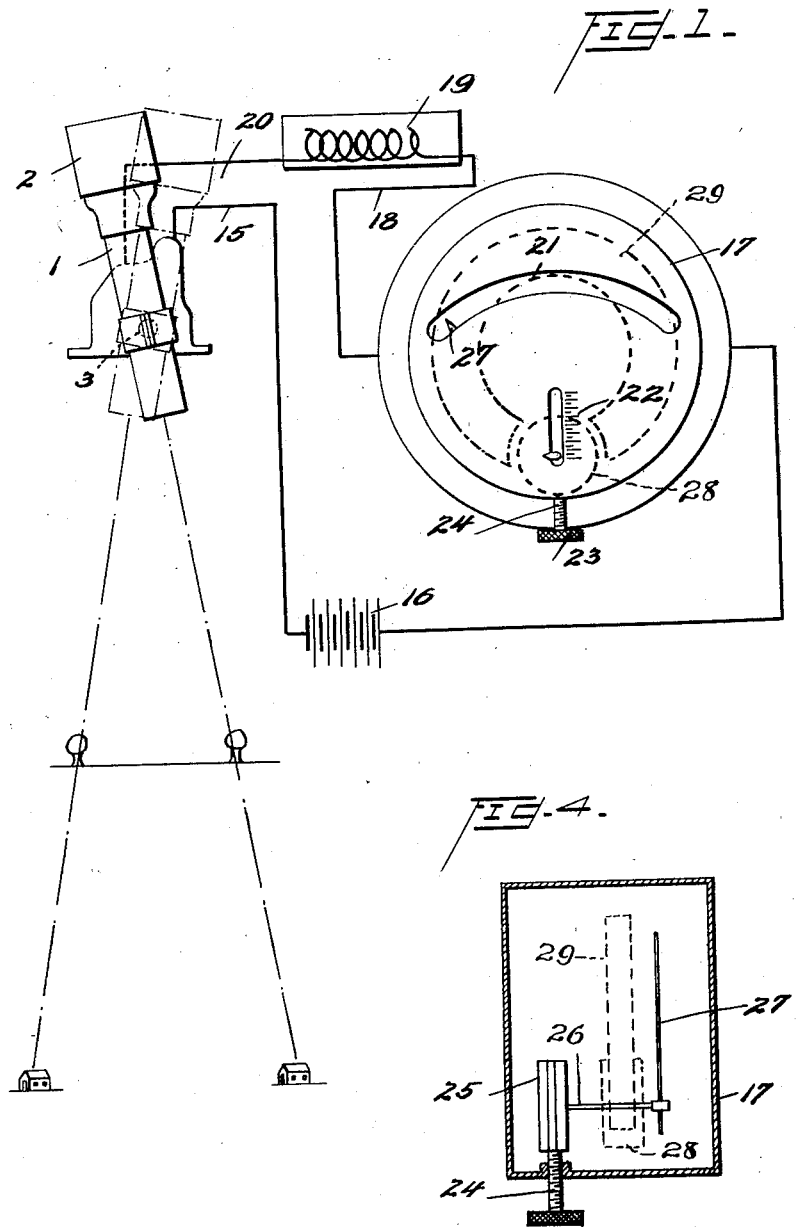

1,676,965

UNITED STATES PATENT OFFICE.

HERBERT O. RUSSELL, OF DETROIT, MICHIGAN, AND CHARLES LEIGH PAULUS, OF DAYTON, OHIO.

GROUND-SPEED INDICATOR.

Application filed April 18, 1922. Serial No. 555,410.

This invention relates to ground speed indicators, the broad object in view being to provide simple and effective means whereby the ground speed of aircraft may be determined by following a target or fixed object on the ground with a sighting member such as a telescope, the latter electrically controlling a make and break mechanism, voltmeter or ammeter and primary induction coil, said voltmeter or ammeter indicating the speed of the aircraft in accordance with the number of breaks per second, which is the measure of speed with which the telescope or its equivalent is turned in the operation of following the fixed object on the ground.

A further object is to provide means for correcting the indicator in accordance with the altitude of the aircraft.

With the above and other objects in view, the invention consists in the novel construction, combination and arrangement herein fully described, illustrated and claimed.

In the accompanying drawings;

Figure 1 is a side elevation of the sighting member or telescope and the parts adjacent thereto, also illustrating diagrammatically the remainder of the apparatus.

Figure 2 is a vertical section view through the gear casing, showing the train of gearing for operating the contact make and break device which is also shown.

Figure 3 is a section taken on line 3—3 Figure 2.

Figure 4 is a detailed view of the indicator illustrating the means for adjusting the fulcrum of the indicator hand.

Referring to the drawings, 1 designates a sighting member such as a telescope, the same being provided with a soft flexible eye piece 2 which may be composed of rubber to make the same comfortable to the operator.

The sighting member or telescope 1 is mounted pivotally by means of a shaft 3 which turns with the sighting member. The shaft 3 has fast thereon a large gear 4 which meshes with a pinion 5 on a countershaft 6 also carrying a gear 7 which meshes with a pinion 8 on a cam shaft 9. The cam shaft 9 carries a cam wheel or disc 10 having a plurality of raised portions or projections 11 which successively come in contact with a projection 12 on a spring contact member 13 which is thus rapidly moved into and out of touch with a contact terminal 14 in an electric circuit comprising a wire 15, battery 16, ammeter or voltmeter 17, wire 18, induction coil 19 and wire 20.

The scale 21 of the ammeter or voltmeter is calibrated in miles per hour. A small vertical scale 22 is calibrated in altitude. A knob 23 at the bottom of the indicator 17 turns a threaded adjusting screw 24 which extends up into the casing of the indicator and carries a runner 25 which in turn carries the fulcrum 26 of the indicator hand 27 of the device 17. An electro-magnet 28, which is connected by flexible terminals to the battery 16 and the induction coil 19, is fixed on the spindle or fulcrum 26, and a permanent magnet 29 has its ends adjacent to and on opposite sides of the electro-magnet 28 with the fulcrum positioned as shown in Figure 4. The permanent magnet 29 is permanently fixed in position within the meter 17 and it will be clear that as the fulcrum is moved vertically from the position shown in Figure 4, the electro-magnet will be moved to a greater or less extent, away from the region of maximum flux of the permanent magnet 29, and the indications of the meter 27 will therefore be varied in accordance with the position of the fulcrum.

The operation of the mechanism above described is as follows;

The eye of the observer is applied to the eye piece of the sighting member or telescope and any distinct fixed object on the ground is picked up on the cross hairs of the sighting member. As the telescope is rotated about its fulcrum, keeping the cross hairs upon the object, the cam 10 will be rotated making and breaking the circuit passing through the breaker points at a rate proportional to the angular velocity with which the sighting member is turned. When the breaker points 13 and 14 are normally left in contact, the needle or pointer of the indicator 17 on the scale 21 will indicate the full amount of current delivered by the battery. When the current is made and broken by the breaker points, a proportion of the current is absorbed by the inductance coil 19 so that the needle or pointer 27 will not reach the full amount of current delivered by the battery but only an amount proportional to the rate at which the breaker is operated. Inasmuch as the rate at which the breaker is operated is a measure of the speed at which the sighting member 1 is rotated, and the speed with which the telescope is rotated, a measure of the ground speed of the aircraft, providing proper electric communication has been made, the needle or pointer 27 upon the scale 21 will record the actual ground speed in miles per hour.

What we claim is:

1. In combination in a ground speed indicator for aircraft, a sight, means pivotally mounting said sight for training on a stationary object, an electric circuit including a make and break mechanism, a galvanometer and induction coil, and gearing connecting said sight and make and break mechanism to operate the latter at a speed proportional to the rate of pivotal movement of the sight to cause said galvanometer to give an indication proportional to the ground speed of said craft.

2. In combination in a ground speed indicator for aircraft, a sight, means pivotally mounting said sight for training on a stationary object, an electric circuit including a make and break mechanism, a galvanometer and induction coil, and gearing connecting said sight and make and break mechanism to operate the latter at a speed proportional to the rate of pivotal movement of the sight to cause said galvanometer to give an indication proportional to the ground speed of said craft, said galvanometer including an indicating hand and an adjustable fulcrum therefor to correct for altitude.

In testimony whereof we affix our signatures.

HERBERT O. RUSSELL.
CHARLES LEIGH PAULUS.